(12) United States Patent
Puskarich

(10) Patent No.: US 12,014,540 B1
(45) Date of Patent: Jun. 18, 2024

(54) SYSTEMS AND METHODS FOR ANNOTATING MEDIA

(71) Applicant: Apple Inc., Cupertino, CA (US)

(72) Inventor: Paul G. Puskarich, London (GB)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 17/336,164

(22) Filed: Jun. 1, 2021

Related U.S. Application Data

(60) Provisional application No. 63/049,554, filed on Jul. 8, 2020.

(51) Int. Cl.
*G06F 16/587* (2019.01)
*G06F 16/58* (2019.01)
*G06V 20/20* (2022.01)

(52) U.S. Cl.
CPC .......... *G06V 20/20* (2022.01); *G06F 16/5866* (2019.01); *G06F 16/587* (2019.01)

(58) Field of Classification Search
CPC .... G06V 20/20; G06F 16/5866; G06F 16/587
USPC ........................................................ 382/154
See application file for complete search history.

(56) References Cited

U.S. PATENT DOCUMENTS

| | | | |
|---|---|---|---|
| 7,698,660 B2 | 4/2010 | Sanchez et al. | |
| 7,753,789 B2 | 7/2010 | Walker | |
| 9,235,268 B2 | 1/2016 | Arrasvuori et al. | |
| 2012/0173347 A1* | 7/2012 | De Almeida Neves | G06K 7/10861 705/16 |
| 2012/0271767 A1* | 10/2012 | Bonnell | G06Q 10/083 705/325 |
| 2014/0067955 A1 | 3/2014 | Christian | |
| 2014/0096011 A1 | 4/2014 | Grosz | |
| 2016/0180191 A1* | 6/2016 | Nobuoka | G06V 20/52 382/199 |
| 2020/0005225 A1* | 1/2020 | Chaubard | H04N 23/698 |

* cited by examiner

*Primary Examiner* — Stephen P Coleman
(74) *Attorney, Agent, or Firm* — BAKERHOSTETLER

(57) ABSTRACT

A media annotation and feedback system can be provided to help a user annotate multimedia content (e.g., photos, videos, portraits, documents, records). Using multiple modes of interaction (e.g., speech, voice, text, handwriting, song), autobiographical and biographical stories can be created. These stories can help a user attribute knowledge and information relating to artifacts that they feel are meaningful and wish to share with others in the future. Such media annotation can facilitate the creation and sharing of stories regarding a person, family, or other group.

15 Claims, 8 Drawing Sheets

SYSTEMS AND METHODS FOR ANNOTATING MEDIA

CROSS-REFERENCE TO RELATED APPLICATION

This application claims the benefit of U.S. Provisional Application No. 63/049,554, entitled "SYSTEMS AND METHODS FOR ANNOTATING MEDIA," filed Jul. 8, 2020, the entirety of which is incorporated herein by reference.

TECHNICAL FIELD

The present description relates generally to annotation of media, including to systems and methods that provide for automated and user-driven input and output based on detections made by an electronic device.

BACKGROUND

Various electronic devices can be used to capture, create, and edit media, for example, by capturing images, recording audio, storing text, and other such media formats. Electronic devices have become increasingly portable in recent years, offering more opportunities for a user to create media that represents everyday life. Such devices also offer opportunities to share such media with others.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Various electronic devices can be used to capture, create, and edit media, for example, by capturing images, recording audio, storing text, and other such media formats. Electronic devices have become increasingly portable in recent years, offering more opportunities for a user to create media that represents everyday life. Such devices also offer opportunities to share such media with others.

Along with such enhanced capabilities comes the risk that large amounts of media can become cumbersome and distract a user from making connections between individual sets of media that are separated by time or partially disparate subject matter. It can be desirable to provide a user with abilities to more conveniently annotate media to add meaningful input. It can be further desirable to provide a user with feedback that is driven by connections between annotations and/or separate sets of media, so that the user can enjoy the media when presented as a story of interrelated concepts.

A media annotation and feedback system can be provided to help a user annotate multimedia content (e.g., photos, videos, portraits, documents, records). Using multiple modes of interaction (e.g., speech, voice, text, handwriting, song), autobiographical and biographical stories can be created. These stories can help a user attribute knowledge and information relating to artifacts that they feel are meaningful and wish to share with others in the future. Such media annotation can facilitate the creation and sharing of stories regarding a person, family, or other group.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
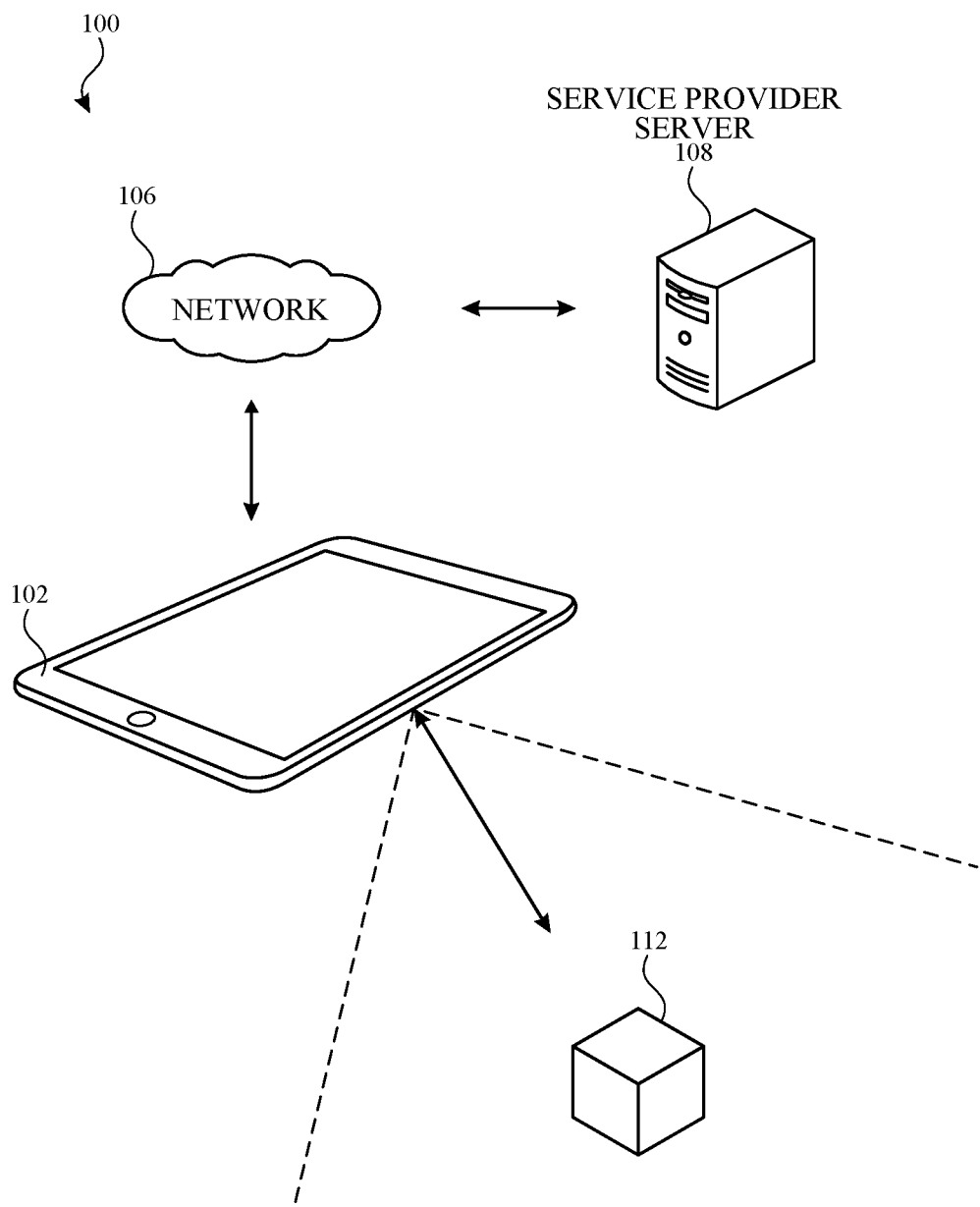
FIG. 1 illustrates an example network environment in which a media annotation system may be implemented in accordance with one or more implementations.

FIG. 1 illustrates an example network environment 100 in which a media annotation system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, one or more subject items 112, a network 106, and a service provider server 108. The network 106 may communicatively couple, for example, the electronic device 102 to the service provider server 108. In one or more implementations, the network 106 may be an interconnected network of devices that may include, or may be communicatively coupled to, the Internet.

The service provider server 108 may include one or more server devices that may facilitate a service being provided to a user via the electronic device 102, such as a subject item library service. In one or more implementations, the one or more service provider servers 108 may include and/or be communicatively coupled to one or more servers corresponding to one or more physical items, such as servers associated with manufacturers of the physical items. The service provider server 108 may be, and/or may include all or part of, the electronic system discussed below with respect to FIG. 9.

The electronic device 102 may be, for example, a portable computing device such as a tablet device, a laptop computer, a smartphone, a smart watch, a head-mountable device, smart speaker, or other appropriate devices that include one or more sensors, such as image sensors, infrared sensors, depth sensors, thermal (e.g., infrared) sensors, and the like, and/or that include one or more wired or wireless communication interfaces, such as one or more universal serial bus (USB) interfaces, near-field communication (NFC) radios, wireless local area network (WLAN) radios, Bluetooth radios, Zigbee radios, cellular radios, and/or other wireless radios. In FIG. 1, by way of example, the electronic device 102 is depicted as a tablet device. An example electronic device 102 may be, and/or may include all or part of, the electronic device discussed below with respect to FIG. 2 and/or the system discussed below with respect to FIG. 9.

The subject items 112 may include any physical item, including people, devices, possessions, scenery, and the like. It will be understood that a captured image can include multiple subject items, and at least one of the subject items can be distinguished from others. One or more subject items 112 may be associated with a visual identifier (or visual cue) that can be used to distinctly identify the subject item 112. The visual identifier may be, for example, a particular color scheme of the subject item 112, a particular shape of the subject item 112, a particular size of the subject item 112, a particular marking on the subject item 112, such as quick response (QR) codes or other bar codes or markings, a visual feature or marking that is exposed through image processing, and/or generally any combination thereof. Where the subject items 112 include people, the people can be distinguished, for example, with facial recognition.

The subject items 112 may each be associated with a distinct visual identifier (or visual cue) that can be used to identify each of the individual items and/or to identify a type of each of the individual items. The visual identifiers may be, for example, built into the overall design and/or aesthetic of the individual items and/or the partial or complete assembly thereof.

For explanatory purposes, the subject system is discussed herein with respect to a physical item. However, as discussed above, the subject system is not limited to physical items. For example, the subject system may also be applicable to virtual items, projections of physical items, such as two-dimensional projections and/or three-dimensional/holographic projections.

In one or more implementations, the subject system may also be used to gather data, facilitate annotation, and provide feedback to a user.

Figure 2:
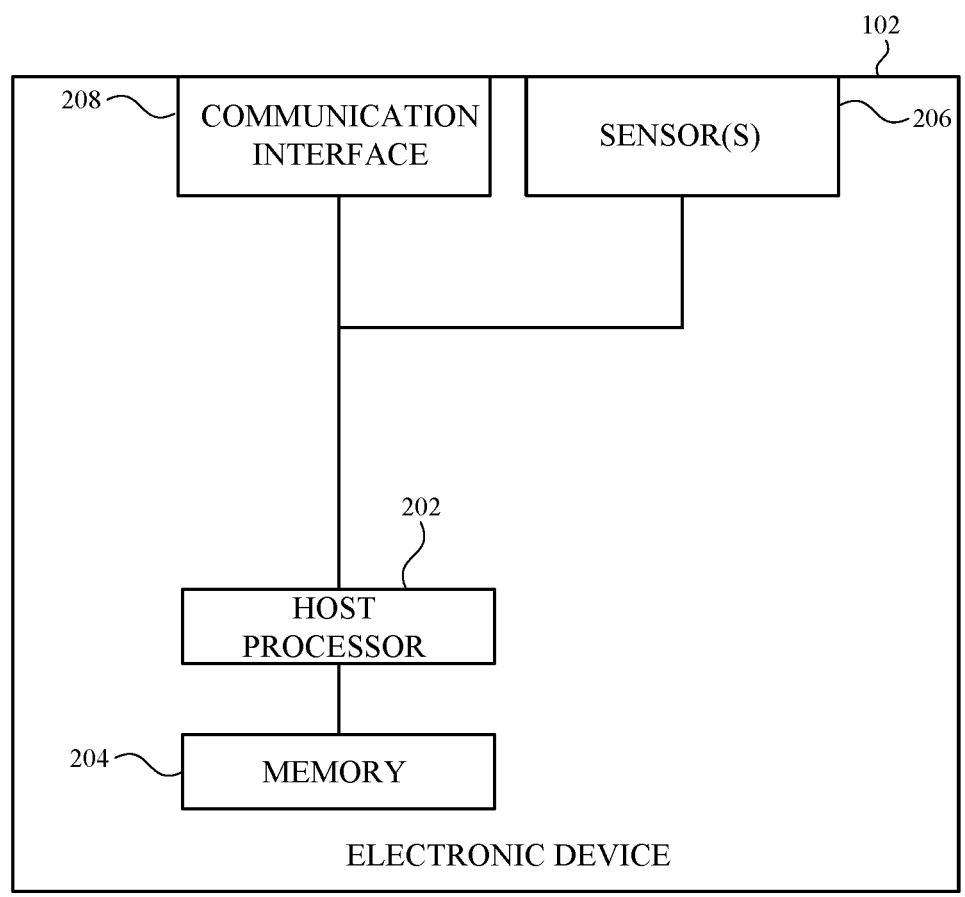
FIG. 2 illustrates an example electronic device that may be used in a media annotation system in accordance with one or more implementations.

FIG. 2 illustrates an example electronic device 102 that may be used in a media annotation system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided. In one or more implementations, one or more components of the example electronic device 102 may be implemented on another device.

The electronic device 102 may include a host processor 202, a memory 204, a communication interface 208, and one or more sensors 206. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The communication interface 208 may include suitable logic, circuitry, and/or code that enables wired or wireless communication, such as over the network 106 with the service provider server 108 and/or directly with the subject item 112. The communication interface 208 may include, for example, one or more of a Bluetooth communication interface, an NFC interface, a Zigbee communication interface, a WLAN communication interface, a USB communication interface, or generally any communication interface. The one or more sensors 206 may include, for example, one or more image sensors, one or more depth sensors, one or more infrared sensors, one or more thermal (e.g., infrared) sensors, and/or generally any sensors that may be used to detect the subject items 112, and/or a current configuration of the subject items 112. In one or more implementations, the communication interface 208 may be used to detect the subject item 112, such as by detecting beacon signals transmitted by the subject item 112 and/or one or more components thereof.

In one or more implementations, one or more of the host processor 202, the memory 204, the one or more sensors 206, the communication interface 208, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
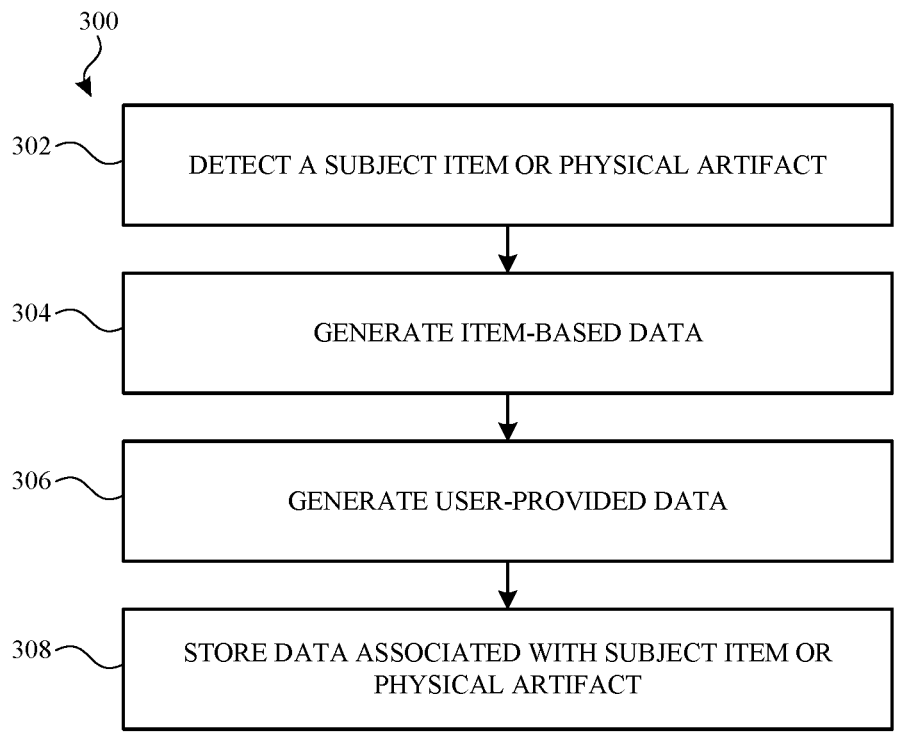
FIG. 3 illustrates a flow diagram of an example process for media annotation based including data collection in accordance with one or more implementations.

FIG. 3 illustrates a flow diagram of an example process 300 for media annotation in accordance with one or more implementations. For explanatory purposes, the process 300 is primarily described herein with reference to the electronic device 102 and the subject item 112 of FIG. 1. However, the process 300 is not limited to the electronic device 102 and/or the subject item 112 of FIG. 1, and one or more blocks (or operations) of the process 300 may be performed by one or more other components or chips of the electronic device 102 and/or of the subject item 112. The electronic device 102 also is presented as an exemplary device and the operations described herein may be performed by any suitable device. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The process 300 can begin when the electronic device 102 captures an image of one or more subject items, such as by using the one or more sensors 206 (302). In one or more implementations, the set of subject items may be represented by the subject items 112 of FIG. 1. The electronic device 102 detects (or recognizes), based on the captured image, the individual subject items of the set of the subject items and a current configuration of the set of subject items.

For example, the electronic device 102 may perform pattern recognition on the captured image to identify the individual subject items, and/or to identify a current configuration of the subject items, based at least in part on the one or more distinct visual identifiers (or visual cues) associated with each of the subject items. The visual identifiers may be, for example, built into the overall design and/or aesthetic of the subject items such that the visual cues may not be noticeable to a person handling the components. For example, the visual identifiers may include variations in colors of the subject items, variations in shapes of the subject items, markings on the subject items, such as QR codes or other markings, and/or generally any combination thereof. In one or more implementations, the electronic device 102 may store and/or may have access to a data structure, such as a database that stores associations between the distinct visual identifiers, the individual subject items and/or the types of individual subject items, and/or identifiers for communicating with one or more of the individual subject items.

In one or more implementations, the electronic device 102 may process the captured image based on one or more of hue space, brightness, color space, luminosity, and the like. The electronic device 102 may perform edge detection on the captured image to detect the edges of the individual subject items and may construct the shapes of the individual subject items based on the detected edges. The electronic device 102 may identify the individual subject items based at least in part on the determined shapes, the colors of the subject items and/or location of colors on the subject items, and/or generally any other visible or detectable features. The electronic device 102 may also use one or more image sensors to generate a depth map for the captured image to reconcile the individual subject items, such as based on the directions in which the individual subject items are extended. In one or more implementations, the electronic device 102 may use a thermal (e.g., infrared) sensor to determine which of the subject items was most recently handled by a user, e.g. the subject item with a different heat signature than the other subject items.

Once the electronic device 102 detects the subject item(s), the electronic device 102 can generate (or receive) item-based data (304). For example, the electronic device 102 can record one or more determined characteristics of the subject item itself. Such characteristics can include an identity, visual feature, or other criteria used to detect the subject item. By further example, the electronic device 102 can record characteristics relating to the captured image that contains the subject item. Such characteristics can include a date and/or time that the image is captured and/or a location at which the image is captured. Such item-based data can be recorded in an automated manner, without requiring additional instruction from a user.

Once the electronic device 102 detects the subject item(s), the electronic device 102 can also generate (or receive) user-provided data (306). For example, the electronic device 102 can receive input from the user with a user input element of the electronic device 102. The input can include an annotation provided by the user that is recorded as data and associated with the detected subject item. For example, the user can provide information regarding the subject item. Such annotation information can include an identity, meaning, purpose, location, source, origin, history, intentions, and other information related to the subject item.

Once the electronic device 102 generates, receives, records, or otherwise processes data, the electronic device 102 can store the item-based data and/or the user-provided data (306). The data can be stored in the electronic device 102 or another device (e.g., the service provider server 108 of FIG. 1). The data can be stored in a manner that associates the data with the corresponding subject item, as described further herein.

Figure 4:
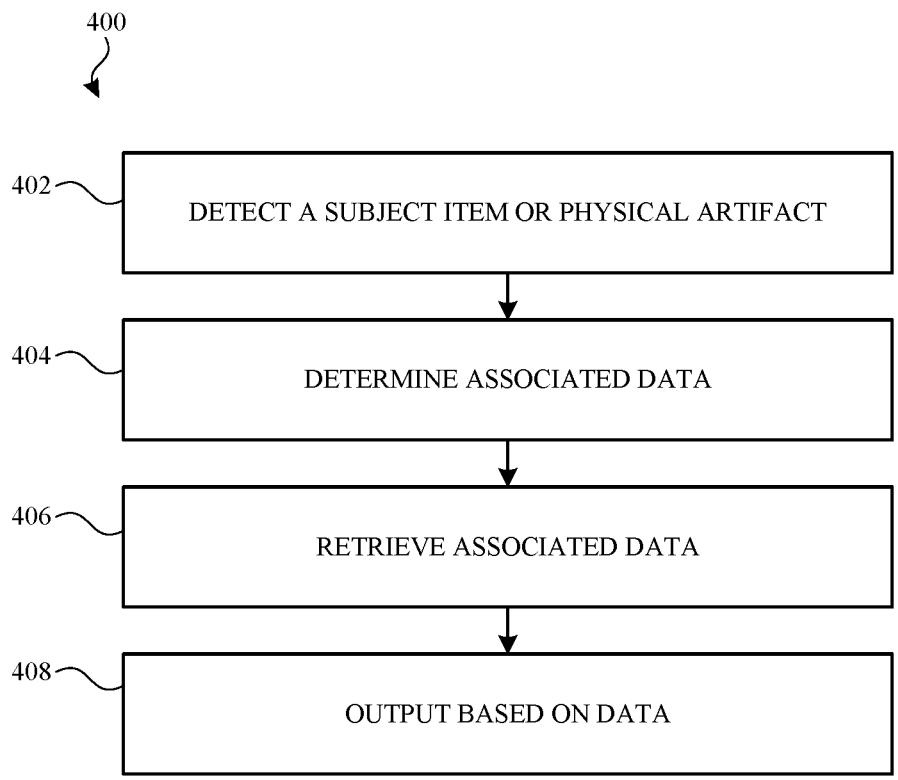
FIG. 4 illustrates a flow diagram of an example process for media annotation including feedback in accordance with one or more implementations.

FIG. 4 illustrates a flow diagram of an example process 400 for media feedback in accordance with one or more implementations. For explanatory purposes, the process 400 is primarily described herein with reference to the electronic device 102 and the subject item 112 of FIG. 1. However, the process 400 is not limited to the electronic device 102 and/or the subject item 112 of FIG. 1, and one or more blocks (or operations) of the process 400 may be performed by one or more other components or chips of the electronic device 102 and/or of the subject item 112. The electronic device 102 also is presented as an exemplary device and the operations described herein may be performed by any suitable device. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The process 400 can begin when the electronic device 102 captures an image of one or more subject items, such as by using the one or more sensors 206 (402). In one or more implementations, the set of subject items may be represented by the subject items 112 of FIG. 1. In one or more implementations, the electronic device 102 may process the captured image as described above with respect to operation 302 of FIG. 3. However, the subject item(s) can either be the same or different items referenced with respect to the process 300 illustrated in FIG. 3. Such distinctions can be made as data regarding the subject item is determined.

For example, once the electronic device 102 detects the subject item(s), the electronic device 102 can determine what data is properly associated with the detected subject item (404). For example, the electronic device 102 can analyze one or more determined characteristics of the subject item itself. Such characteristics can include an identity, visual feature, or other criteria used to detect the subject item. The electronic device 102 can compare the characteristics to those determined with respect to a previously detected subject item (e.g., in process 300). If the newly detected subject item is determined to be the same as that previously detected, then the subject items are determined to have the same identity, and the newly detected subject item can be associated with the data of the previously detected subject item.

Where the previously detected subject item (i.e., "first subject item") is determined to be different than the newly detected subject item (i.e., "second subject item"), other comparisons can be made to determine whether the second subject item can be associated with the first subject item in other ways. For example, item-based data and/or user-provided data of a first subject item can be compared to item-based data and/or user-provided data of a second subject item. Where one or more data elements are common to both the first subject item and the second subject item, such data of the second subject item can be associated with such data of the first subject item, despite a difference of subject item identity.

Data that is associated with the detected subject item can be retrieved (406). Such data can be stored locally on the electronic device 102 or at another location (e.g., the service provider server 108 of FIG. 1). Such data can be any data relating to a newly detected subject item and/or a previously detected subject item. In some embodiments, the data can be the data that is common to both the previously detected subject item (i.e., "first subject item") and the newly detected subject item (i.e., "second subject item").

Data associated with the detected subject item can be output to a user (408). The data can be output in a manner corresponding to the type of data (e.g., visual, audio, etc.). The data can be output in response to the detection of the subject item, as described further herein.

Figure 5:
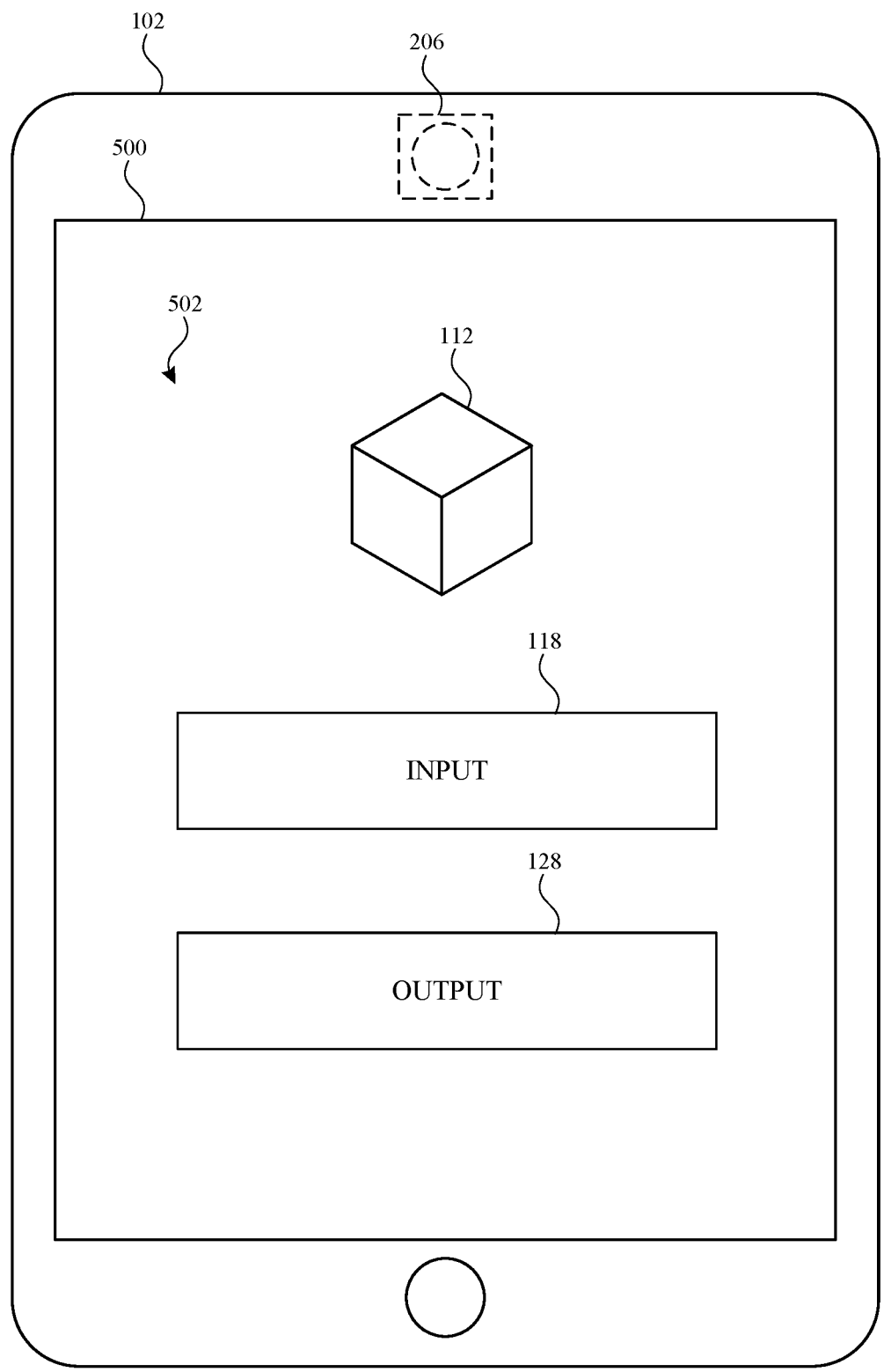
FIG. 5 illustrates an example electronic device displaying an example user interface in accordance with one or more implementations.

FIG. 5 illustrates an example electronic device 102 displaying an example user interface 502 for annotating media and providing feedback in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes the one or more sensors 206, such as an image sensor, and includes a display 500 that displays the user interface 502. The user interface 502 can include an image of a subject item 112, an input element 118, and/or an output element 128. The subject item 112 can include the detected subject item 112 of FIG. 1. It will be understood that the user interface 502 can further include images and/or subject items other than and/or in addition to the detected subject items 112. It will be further understood that the user interface 502 can exclude the image of the subject item 112.

The subject item 112 of the user interface 502 can be displayed during and/or after the detection thereof by the electronic device 102. Upon detection, the subject item 112 can be displayed for any duration of time that provides an opportunity for a user to input annotations to be recorded as user-provided data. By further example, the subject item 112 can be displayed for a duration of time that corresponds to the display of an output element 128, as described further herein.

As shown in FIG. 5, the user interface 502 can include the input element 118. The input element 118 can be operated by a user to input annotations relating to the detected subject item 112. For example, the input element 118 can include or be operated by a touchscreen, keyboard, mouse, or other input device. The input element 118 can be or include selectable elements (e.g., from a menu) or another input format (e.g., text, handwriting, and the like). The input element 118 can facilitate operation of other input types. For example, the input element 118 can control (e.g., start, stop, etc.) recording of audio or other inputs by the electronic device 102. The user input can be recorded as user-provided data and associated with the detected subject item 112.

The input element 118 can be displayed during and/or after display of the captured image of the subject item 112. For example, the image of the subject item 112 can be displayed as a guide or reference to assist the user providing annotations via the input element 118. By further example, the image of the subject item 112 need not be displayed as the input element 118 is provided.

As further shown in FIG. 5, the user interface 502 can include the output element 128. The output element 128 can provide information to a user based on data that is determined to be associated with the detected subject item 112, as described herein. For example, the output element 128 can display or otherwise output data that was received with respect to the detected subject item 112 or another subject item. By further example, the output element 128 can include item-based data, user-provided data, and/or an image of another subject item, where such are determined to be associated with the detected subject item 112, as described herein. The output element 128 can facilitate operation of other output types. For example, the output element 128 can control (e.g., start, stop, etc.) playback of audio or other outputs by the electronic device 102.

The output element 128 can be displayed during and/or after display of the captured image of the subject item 112. For example, the image of the subject item 112 can be displayed as a guide or reference to inform the user receiving the feedback from the output element 128. By further example, the image of the subject item 112 need not be displayed as the output element 128 is provided.

Figure 6:
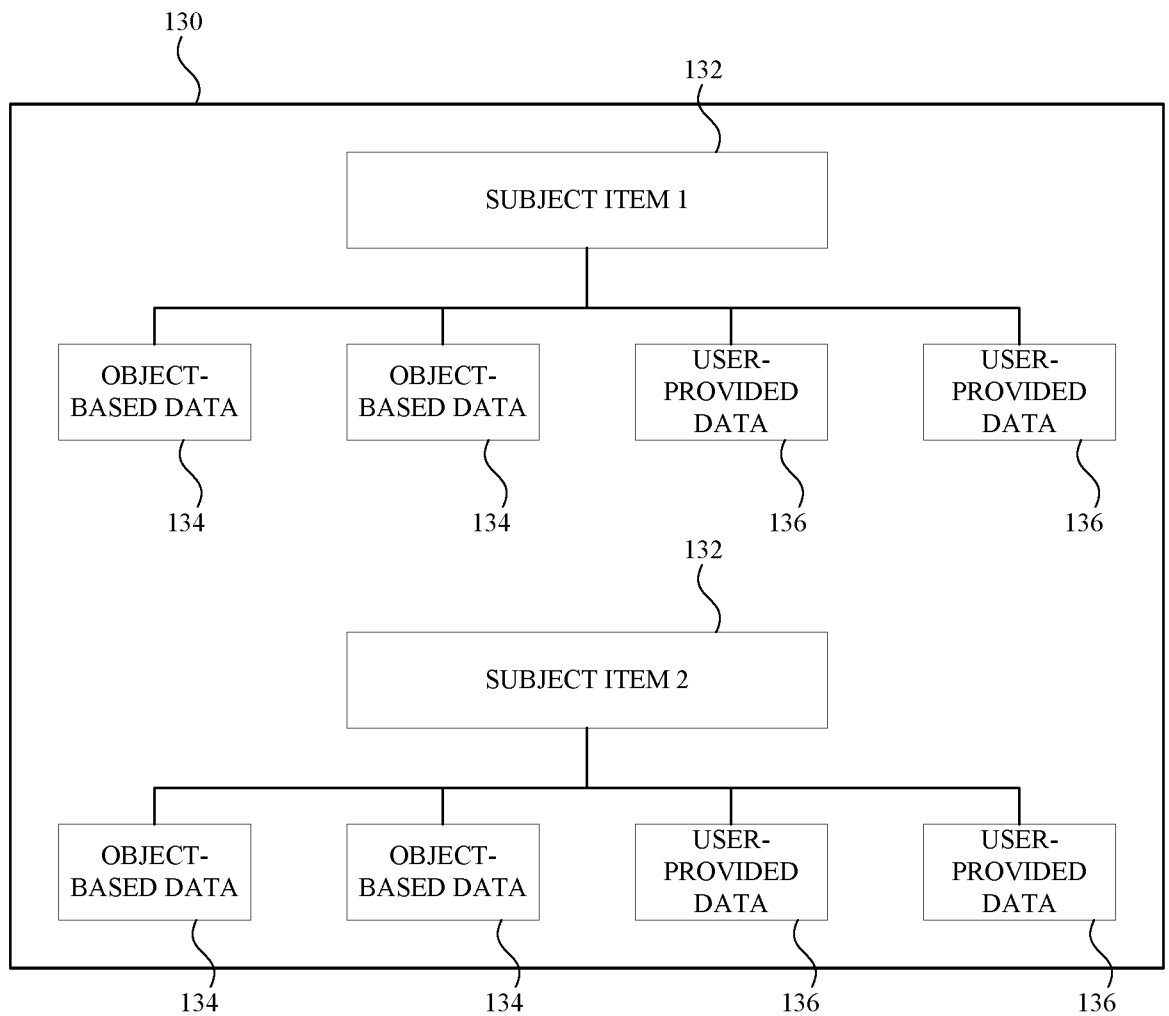
FIG. 6 illustrates an example data structure for storing data relating to various detected subject items in accordance with one or more implementations.

FIG. 6 illustrates an example of a data structure 130 for storing data associated with detected subject items. As shown in FIG. 6, a data structure 130 (e.g., database, etc.) can be provided in which data relating to each of multiple subject item entries 132 can be stored. For each subject item entry 132, one or more object-based data entries 134 and/or user-provided data entries 136 can be stored. Each of the data entries can created and/or modified when detections are made and/or annotations are received. Where separate detections of subject items are made, the data entries of each can be compared to determine whether any are held in common. On the basis of such a comparison, subject items and/or the data thereof can be associated. It will be understood that establishing associations can include merging data entries into a single set. Additionally or alternatively, establishing associations can include creating and/or modifying data entries that refer to each other.

For example, data can be compared to see if they have the same values. Such values can correspond to an identity, visual feature, or other criteria used to detect each of the subject items. By further example, the values can correspond to the identity, meaning, purpose, location, source, origin, history, intentions, and other information related to the subject item. Accordingly, different subject items can be associated with each other and/or each other's data to establish connections. On this basis, a given subject item can be invoked and/or presented to the user when a different subject item is detected, where the two subject items have a data and/or value in common. It will be understood that such associations can be based on proximity, rather than merely equivalent values. For example, two values can be associated by being within a threshold range and/or distance of each other.

Figure 7:
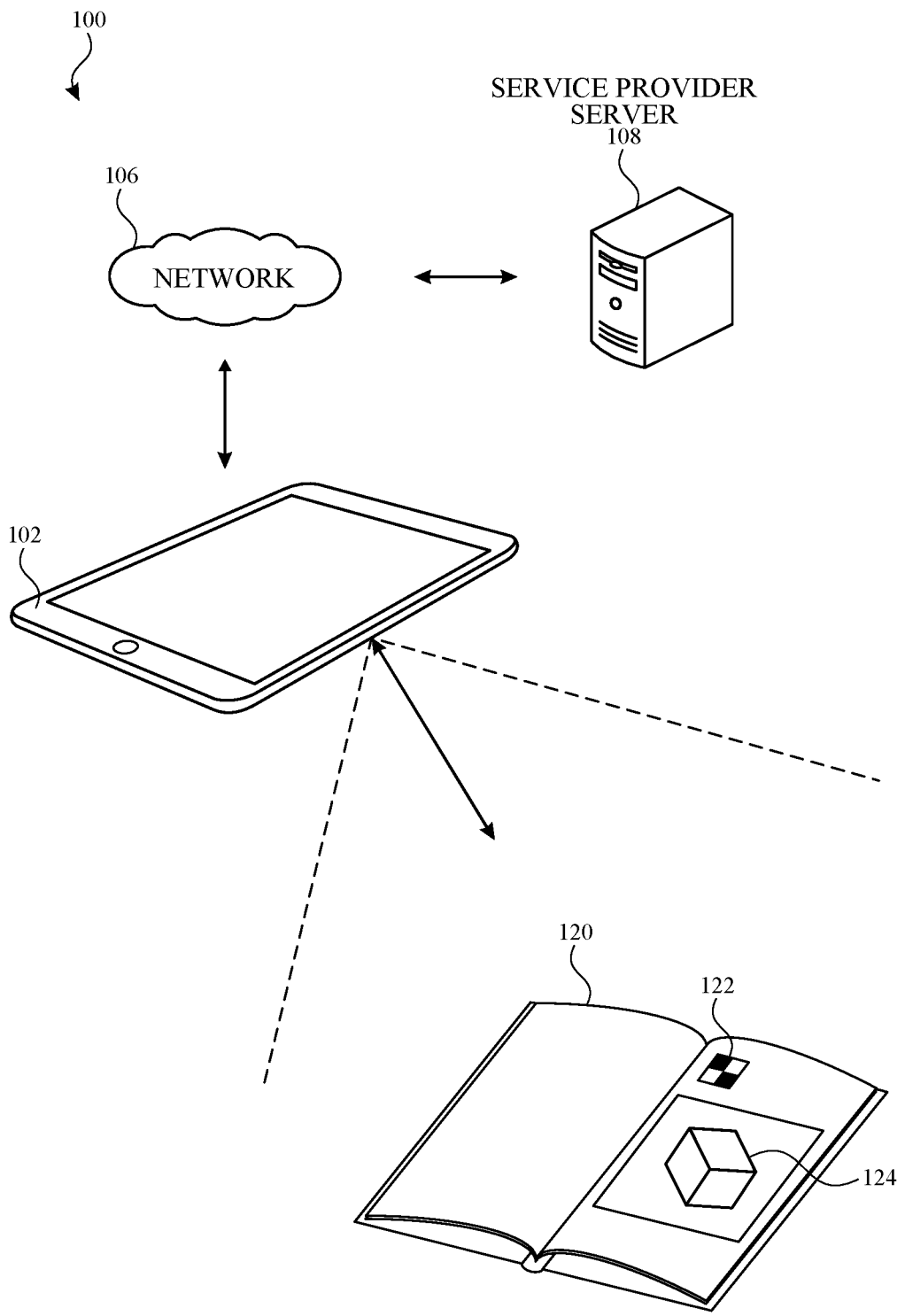
FIG. 7 illustrates an example network environment in which a media annotation system may be implemented in accordance with one or more implementations.

FIG. 7 illustrates an example network environment 100 in which a media annotation system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 102, one or more physical artifacts 120, a network 106, and a service provider server 108. The physical artifacts 120 may include any physical item that includes a representation 124 of a subject item and, optionally, an identifier 122. For example, the physical item can include a picture frame, scrapbook, photo album, book, and the like.

The representation 124 of the subject item can be any observable item for which additional information can be provided. For example, the representation 124 of the subject item can correspond to an image of a subject item captured by the electronic device 102 or another device. In such an example, the representation 124 of the subject item can be physically generated (e.g., printed) as part of the physical artifact 120 and based on the captured image. Where annotations were made at or after the time of capturing the image, the electronic device 102 can provide feedback based on the detection of the physical artifact 120.

The identifier 122 can be separate from the representation 124. The identifier 122 can be used to distinctly identify the physical artifact 120 or a portion thereof. For example, the identifier 122 can include quick response (QR) codes or other bar codes or markings, a visual feature or marking that is exposed through image processing, and/or generally any combination thereof. By further example, the identifier 122 can include an item that is wirelessly detectable by the electronic device 102. Such wireless communication can employ a short-range communication method, such as near field communication ("NFC"), radio-frequency identification ("RFID"), Bluetooth, Wi-Fi, Wi-Fi Direct, short-range 802.11, and/or high frequency focused beams such as 60 GHz. Alternatively or additionally, communication between the electronic device 102 and the identifier 122 can employ a high frequency communication method, such as WirelessHD, WiGig, and/or Wi-Fi IEEE 802.11ad.

Alternatively or additionally, communication between the electronic device 102 and the identifier 122 can employ ultra-wideband ("UWB"), using low energy levels for short-range, high-bandwidth communications over a large portion of the radio spectrum (e.g., >500 MHz). The identifier 122 can further include a particular color scheme of the physical artifact 120, a particular shape of the physical artifact 120, a particular size of the physical artifact 120, and/or a particular marking on the physical artifact 120.

The identifier 122 can identify the entire physical artifact 120 to the electronic device 102, where the electronic device 102 can retrieve information regarding the physical artifact 120 from a database based on the detection of the identifier 122. Additionally or alternatively, the identifier 122 can identify only a portion (e.g., page, section, or individual representation 124) of the physical artifact 120, where the electronic device 102 can retrieve information regarding the particular portion from a database based on the detection of the identifier 122.

Figure 8:
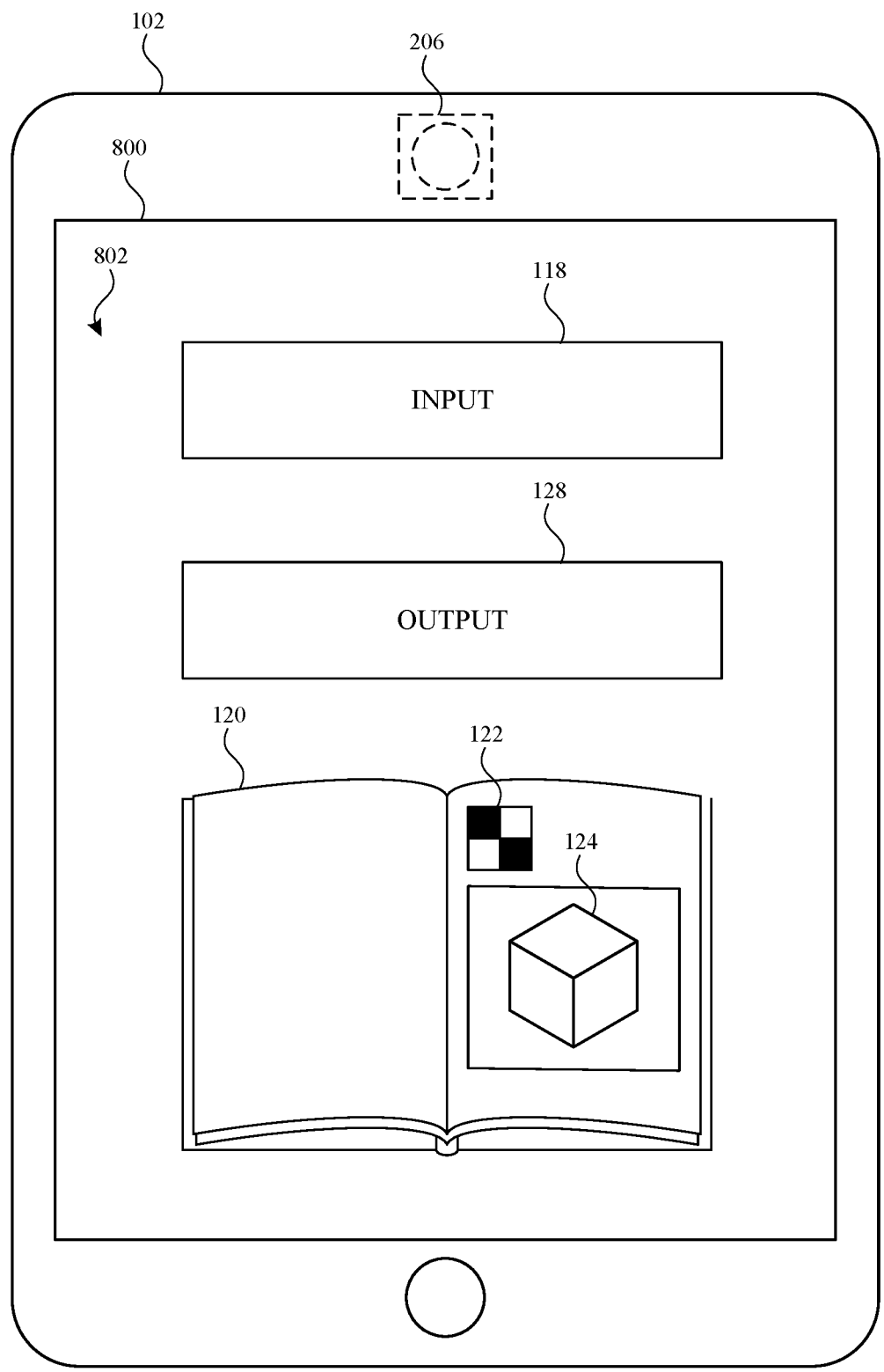
FIG. 8 illustrates an example electronic device displaying an example user interface in accordance with one or more implementations.

FIG. 8 illustrates an example electronic device 102 displaying an example user interface 802 for annotating media and providing feedback in accordance with one or more implementations. Not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

The electronic device 102 includes the one or more sensors 206, such as an image sensor, and includes a display 800 that displays the user interface 802. The user interface 802 can include an image of a physical artifact 120, the identifier 122, the representation 124, an input element 118, and/or an output element 128. The physical artifact 120 can include the detected physical artifact 120 of FIG. 7. It will be understood that the user interface 802 can further include images and/or subject items other than and/or in addition to the detected physical artifacts 120. It will be further understood that the user interface 802 can exclude the image of the physical artifact 120.

The physical artifact 120 of the user interface 802 can be displayed during and/or after the detection thereof by the electronic device 102. Upon detection, the physical artifact 120 can be displayed for any duration of time that provides an opportunity for a user to input annotations to be recorded as user-provided data. By further example, the physical artifact 120 can be displayed for a duration of time that corresponds to the display of an output element 128, as described further herein.

As shown in FIG. 8, the user interface 802 can include the input element 118. The input element 118 can be operated by a user to input annotations relating to the detected physical artifact 120 and/or the subject item depicted in the representation 124. For example, the input element 118 can include or be operated by a touchscreen, keyboard, mouse, or other input device. The input element 118 can be or include selectable elements (e.g., from a menu) or another input format (e.g., text, handwriting, and the like). The input element 118 can facilitate operation of other input types. For example, the input element 118 can control (e.g., start, stop, etc.) recording of audio or other inputs by the electronic device 102. The user input can be recorded as user-provided data and associated with the detected physical artifact 120 and/or the subject item depicted in the representation 124.

The input element 118 can be displayed during and/or after display of the captured image of the physical artifact 120 and/or the subject item depicted in the representation 124. For example, the image of the physical artifact 120 and/or the subject item depicted in the representation 124 can be displayed as a guide or reference to assist the user providing annotations via the input element 118. By further example, the image of the physical artifact 120 and/or the subject item depicted in the representation 124 need not be displayed as the input element 118 is provided.

As further shown in FIG. 8, the user interface 802 can include the output element 128. The output element 128 can provide information to a user based on data that is determined to be associated with the detected physical artifact 120 and/or the subject item depicted in the representation 124, as described herein. For example, the output element 128 can display or otherwise output data that was received with respect to the detected physical artifact 120 and/or the subject item depicted in the representation 124. By further example, the output element 128 can include item-based data, user-provided data, and/or an image of another subject item, where such are determined to be associated with the detected physical artifact 120 and/or the subject item depicted in the representation 124, as described herein. The output element 128 can facilitate operation of other output types. For example, the output element 128 can control (e.g., start, stop, etc.) playback of audio or other outputs by the electronic device 102.

The output element 128 can be displayed during and/or after display of the captured image of the physical artifact 120 and/or the subject item depicted in the representation 124. For example, the image of the physical artifact 120 and/or the subject item depicted in the representation 124 can be displayed as a guide or reference to inform the user receiving the feedback from the output element 128. By further example, the image of the physical artifact 120 and/or the subject item depicted in the representation 124 need not be displayed as the output element 128 is provided.

It will be understood that annotations and/or inputs can be recorded with respect to a detected subject item, and the associated data can be provided as feedback and/or outputs upon subsequent detection of a physical artifact that contains a representation of the previously detected subject item or a representation of a subject item that is associated with the previously detected subject item.

It will be further understood that annotations and/or inputs can be recorded with respect to a detected physical artifact that contains a representation of a subject item, and the associated data can be provided as feedback and/or outputs upon subsequent detection of the actual subject item or a subject item that is associated with the subject item depicted in the physical artifact.

Figure 9:
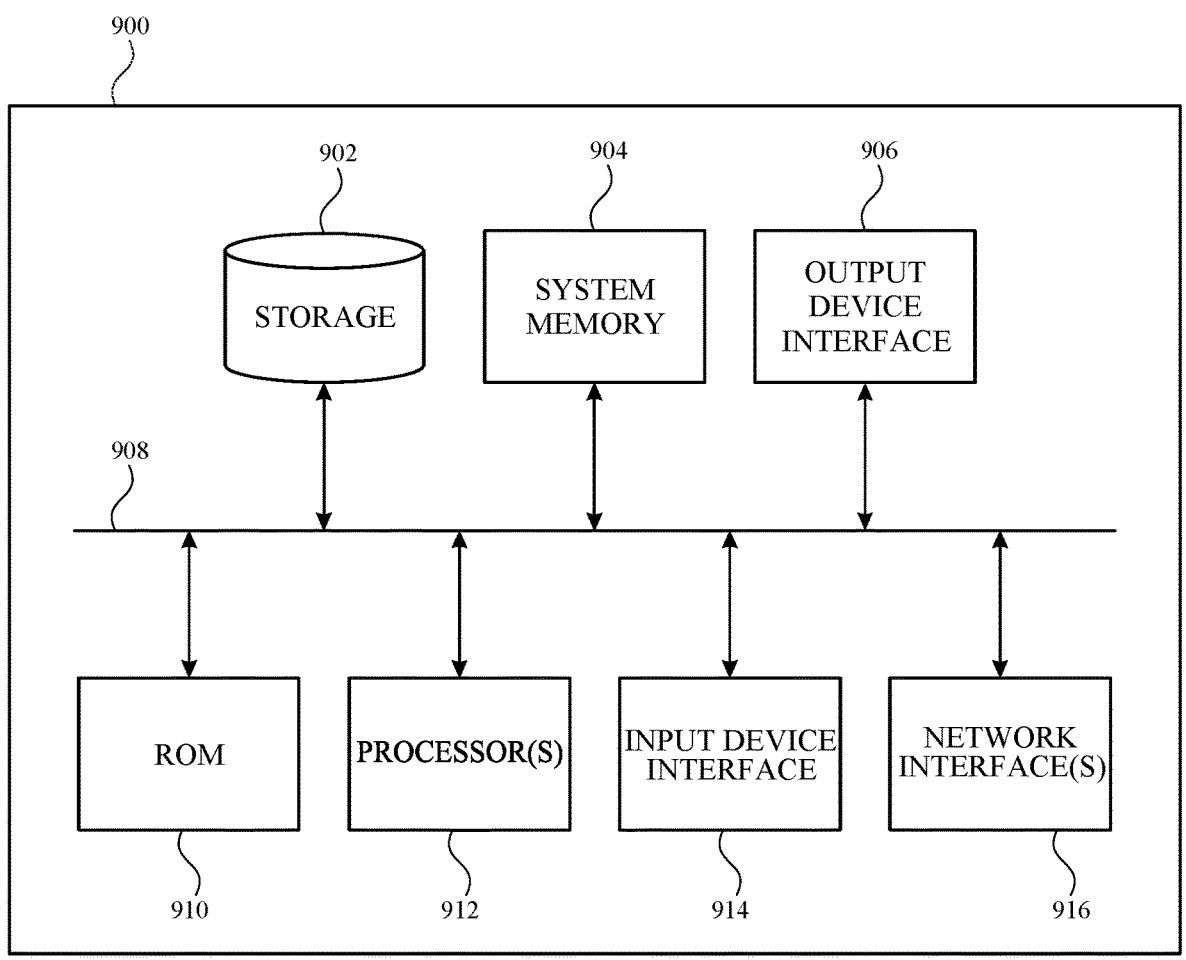
FIG. 9 conceptually illustrates an electronic system with which aspects of the subject technology may be implemented in accordance with one or more implementations.

FIG. 9 conceptually illustrates an electronic system 1000 with which one or more implementations of the subject technology may be implemented. The electronic system 1000 can be, and/or can be a part of, the electronic device 102, the subject item 112, and/or the service provider server 108 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 1008 also couples the electronic system 1000 to one or more networks and/or to one or more network nodes through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, subject items, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

Accordingly, embodiments of the present disclosure provide a media annotation and feedback system to help a user annotate multimedia content (e.g., photos, videos, portraits, documents, records). Using multiple modes of interaction (e.g., speech, voice, text, handwriting, song), autobiographical and biographical stories can be created. These stories can help a user attribute knowledge and information relating to artifacts that they feel are meaningful and wish to share with others in the future. Such media annotation can facilitate the creation and sharing of stories regarding a person, family, or other group.

Various examples of aspects of the disclosure are described below as clauses for convenience. These are provided as examples, and do not limit the subject technology.

Clause A: an electronic device, comprising: an image sensor configured to capture an image of a subject item; a display configured to provide a visual output to a user; a processor configured to: capture, with the image sensor, a first image of a subject item; while the image of the subject item is provided on the display, record data associated with the subject item; capture, with the image sensor, a second image of a physical artifact comprising a representation of the subject item based on the first image; and based on the second image, provide an output corresponding to the data associated with the subject item.

Clause B: an electronic device, comprising: an image sensor configured to capture images; a display; a processor configured to: capture, with the image sensor, an image of a first subject item; store data associated with the first subject item; capture, with the image sensor, an image of a second subject item; determine whether the second subject item is associated with the data of the first subject item; and if the second subject item is associated with the data, provide an output corresponding to the data or the first subject item.

Clause C: an electronic device, comprising: an image sensor; an input element; a processor configured to: capture, with the image sensor, a first image of a physical artifact, the physical artifact comprising a representation of a subject item and an identifier corresponding to the subject item; receiving, with the input element, a user input; store the user input as data associated with the subject item; capture, with the image sensor, a second image of the physical artifact; and output, based on the identifier, the data associated with the subject item.

One or more of the above clauses can include one or more of the features described below. It is noted that any of the following clauses may be combined in any combination with each other, and placed into a respective independent clause, e.g., clause A, B, or C.

Clause 1: the image of the physical artifact further comprises a visual identifier corresponding to the subject item; and Clause 2: the processor is further configured to, based on the visual identifier, retrieve the data associated with the subject item.

Clause 3: the data associated with the subject item is recorded on and retrieved from an external device.

Clause 4: an input element configured to receive input from a user, wherein the data comprises user-provided data received with the input element while the image of the subject item is provided on the display.

Clause 5: the input element comprises a touchscreen, a microphone, or a user sensor.

Clause 6: the data is item-based data that is recorded when the image of the subject item is captured.

Clause 7: the data comprises time data or location data.

Clause 8: the output is the visual output provided with the display.

Clause 9: a display.

Clause 10: the user input is received while the first image is provided on the display.

Clause 11: the data associated with the subject item is output without providing the second image on the display.

Clause 12: the data associated with the subject item is output while the second image is provided on the display.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual subject items simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual subject item(s) in a CGR environment may be made in response to representations of physical motions (e.g., vocal commands).

A person may sense and/or interact with a CGR subject item using any one of their senses, including sight, sound, touch, taste, and smell. For example, a person may sense and/or interact with audio subject items that create 3D or spatial audio environment that provides the perception of point audio sources in 3D space. In another example, audio subject items may enable audio transparency, which selectively incorporates ambient sounds from the physical environment with or without computer-generated audio. In some CGR environments, a person may sense and/or interact only with audio subject items.

Examples of CGR include virtual reality and mixed reality.

A virtual reality (VR) environment refers to a simulated environment that is designed to be based entirely on computer-generated sensory inputs for one or more senses. A VR environment comprises a plurality of virtual subject items with which a person may sense and/or interact. For example, computer-generated imagery of trees, buildings, and avatars representing people are examples of virtual subject items. A person may sense and/or interact with virtual subject items in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual subject items). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual subject items to interact with real subject items (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual subject items are superimposed over a physical environment, or a representation thereof. For example, an electronic system for presenting an AR environment may have a transparent or translucent display through which a person may directly view the physical environment. The system may be configured to present virtual subject items on the transparent or translucent display, so that a person, using the system, perceives the virtual subject items superimposed over the physical environment. Alternatively, a system may have an opaque display and one or more imaging sensors that capture images or video of the physical environment, which are representations of the physical environment. The system composites the images or video with virtual subject items, and presents the composition on the opaque display. A person, using the system, indirectly views the physical environment by way of the images or video of the physical environment, and perceives the virtual subject items superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual subject items into the physical environment, for example, as a hologram or on a physical surface, so that a person, using the system, perceives the virtual subject items superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different from the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual subject item may adopt a shape or color of a physical article imaged by one or more imaging sensors. As a further example, a virtual subject item may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual subject items into the physical environment, for example, as a hologram or on a physical surface.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An electronic device, comprising:
    an image sensor configured to capture an image of a subject item;
    a display configured to provide a visual output to a user;
    an input element configured to receive input from the user; and
    a processor configured to:
        capture, with the image sensor, a first image of the subject item;
        receive, with the input element and while the image of the subject item is provided on the display, data associated with the subject item;
        while the image of the subject item is provided on the display, record the data;
        capture, with the image sensor, a second image of a physical artifact comprising a representation of the subject item based on the first image; and
        based on the second image and while the second image is provided on the display, provide an output on the display corresponding to the data associated with the subject item.

2. The electronic device of claim 1, wherein:
    the image of the physical artifact further comprises a visual identifier corresponding to the subject item; and
    the processor is further configured to, based on the visual identifier, retrieve the data associated with the subject item.

3. The electronic device of claim 2, wherein the data associated with the subject item is recorded on and retrieved from an external device.

4. The electronic device of claim 1, wherein the input element comprises a touchscreen, a microphone, or a user sensor.

5. The electronic device of claim 1, wherein the data is item-based data that is recorded when the image of the subject item is captured.

6. The electronic device of claim 5, wherein the data comprises time data or location data.

7. The electronic device of claim 1, wherein the output is the visual output provided with the display.

8. An electronic device, comprising:
    an image sensor configured to capture images;
    a display;
    an input element configured to receive input from a user; and
    a processor configured to:
        capture, with the image sensor, an image of a first subject item;
        receive, with the input element and while the image of the first subject item is provided on the display, data associated with the first subject item;
        store the data associated with the first subject item;

capture, with the image sensor, an image of a second subject item;

determine whether the second subject item is associated with the data of the first subject item; and if the second subject item is associated with the data, provide on the display a first output corresponding to the data and a second output corresponding to the first subject item.

9. The electronic device of claim 8, wherein the data associated with the first subject item is stored on an external device.

10. The electronic device of claim 8, wherein the input element comprises a touchscreen, a microphone, or a user sensor.

11. The electronic device of claim 8, wherein the data is item-based data that is stored when the image of the first subject item is captured.

12. The electronic device of claim 11, wherein the data comprises time data or location data.

13. The electronic device of claim 8, wherein each of the first output and the second output is a visual output provided with the display.

14. An electronic device, comprising:

an image sensor;

an input element;

a display;

a processor configured to:

capture, with the image sensor, a first image of a physical artifact, the physical artifact comprising a representation of a subject item and an identifier corresponding to the subject item;

receiving, with the input element and while the first image is provided on the display, a user input;

store the user input as data associated with the subject item;

capture, with the image sensor, a second image of the physical artifact; and output, on the display, based on the identifier, and while the second image is provided on the display, the data associated with the subject item.

15. The electronic device of claim 14, wherein the data associated with the subject item is output without providing the second image on the display.

* * * * *